GEORGE M. FRANKLIN
LORENZ V. KUNKEL
WILLARD A. LEWIS
 INVENTORS

ATTORNEY

No. 3,552,927
SULFUR RECOVERY APPARATUS
George M. Franklin, Lorenz V. Kunkel, and Willard A. Lewis, Tulsa, Okla., assignors to Pan American Petroleum Corporation, Tulsa, Okla., a corporation of Delaware
Filed July 7, 1967, Ser. No. 651,770
Int. Cl. B01d 5/00; C01b 17/04
U.S. Cl. 23—252
7 Claims

ABSTRACT OF THE DISCLOSURE

A unitized apparatus for use in processing gases in the conversion of hydrogen sulfide to free sulfur is composed of a reheat section, a condensing section and a sulfur separation chamber. Reheat gas is supplied either from the boiler attached to the furnace or from reactor fluid. The hot stream is indirectly heat exchanged with cooled gas from the separation chamber and the resulting preheated feed gas sent to the next reactor. Gases used for the reheating step are taken to the condensing section where free sulfur present is converted into liquid form and flows into the separation chamber from which it is removed.

---

The present invention relates to the manufacture of free sulfur from gas streams containing hydrogen sulfide. More particularly, it is concerned with an improvement in equipment design for such operations wherein a single piece of apparatus functions as a reheater, condenser and separator.

BACKGROUND OF INVENTION

In the conversion of hydrogen sulfide to free sulfur there are two basic procedures that are now used commercially. The first is the Claus process which involves reaction of hydrogen sulfide with sulfur dioxide in the presence of a catalyst to form free sulfur and water, and the second is the direct oxidation process which converts hydrogen sulfide to free sulfur by reaction of the former with oxygen in specific proportions in the presence of a catalyst. The Claus process is used on acid gases containing principally $H_2S$ and $CO_2$, such as are recovered from natural gas sweetening units and refinery desulfurization units.

There are two major variations in the modern Claus process, the straight through and the split flow. In the straight through process all of the acid gas is fed to the boiler with combustion air. The boiler acts as a non-catalytic reactor converting 30–69% of the hydrogen sulfide in the feed to sulfur. The sulfur is generally condensed from the boiler effluent before the first reactor. This sulfur removal allows a lower reactor feed temperature which improves yields without incurring catalyst deactivation by sulfur condensation.

The straight through type of plant has the advantages of simplified instrumentation and high yield. However, it will not be possible to use this process if the hydrogen sulfide content of the acid gas is too low for stable combustion or if the hydrocarbon content is so high as to cause catalyst fouling and dark sulfur and to require excessive combustion air. To overcome these problems, the split flow type of plant is used.

In the split flow process, as much of the acid gas as possible without adversely affecting combustion stability is fed to the waste heat boiler with sufficient air to convert one-third of the total hydrogen sulfide fed to the plant and all hydrocarbons fed to the boiler to sulfur dioxide, carbon dioxide, and water. The excess $H_2S$ fed to the boiler prevents formation of $SO_3$ with resulting corrosion problems and allows some sulfur formation which improves yields. The remaining acid gas is blended with the boiler effluent prior to being charged to the first reactor. If very low hydrogen sulfide concentrations necessitate preheating the acid gas, the split flow process minimizes the preheat duty. The split flow process reduces combustion air requirements for plant feeds having a high light hydrocarbon content.

In the direct oxidation process, $H_2S$ in a gas stream is oxidized with air directly to sulfur over a bauxite catalyst at temperatures up to 1000° F. The reaction is highly exothermic. This process is applicable to sour natural gases as well as acid gases from hydrogen sulfide absorption units. For sour gases, the maximum economic $H_2S$ concentration is about 25 mol percent; for acid gases about 15 mol percent. The direct oxidation step, or steps, is usually followed by a conventional Claus reactor to convert most of the residual $H_2S$ and $SO_2$ to sulfur.

In operation of a conventional straight through Claus sulfur plant, where the hydrogen sulfide and air are fed to a furnace in amounts sufficient to convert about one-third of the hydrogen sulfide to sulfur dioxide, ordinarily about 30–69% of the recoverable sulfur is produced in the furnace. In order to efficiently convert the remaining unreacted hydrogen sulfide and sulfur dioxide to free sulfur in one or more downstream catalytic converters, the sulfur produced in the furnace should be removed before the reactants enter the converter. This is done by passing the boiler effluent through a condenser thus reducing the temperature of the uncondensed phase, for example, to about 350° F. To operate the converter at maximum efficiency, the uncondensed phase should be heated from about 425° to about 450° F. before it contacts the catalyst. In the past this reheating step has been accomplished primarily by one of two methods, i.e., extraction or bypass reheating, and direct fired or inline reheating. These procedures, however, have certain practical disadvantages. For example, in the case of bypass reheating, fluctuations in the feed gas throughput affect the volume of gas used for bypass reheating. Thus, when the plant throughput decreases, the temperature of the boiler effluent—from which the gas is derived for bypass reheating—is substantially lower. Because of this when the volume of throughput decreases, the amount of gas bypassed around the first condenser after the boiler must be increased in order to produce a final feed mixture to the first converter having a proper preheat temperature for initiating reaction of hydrogen sulfide with sulfur dioxide. This in turn results in the introduction of considerable free sulfur—present in the bypass gas— into the catalytic converter thus rendering equilibrium conditions less favorable for the transformation of the hydrogen sulfide to free sulfur. When bypass reheating is used instead of direct fired heating, the incremental sulfur contained in a reactor feed requires that the reactor temperature be raised to prevent catalyst deactivation. This increase in temperature lowers the sulfur yield in that reactor.

With a direct fired or inline heater the initial investment and installation costs are high. Because temperatures of the order of 2500° F. are produced in these heaters, they must be refractory lined and of durable construction. Even then maintenance is often a problem owing to the high temperatures. The refractory sometimes fails causing the sides of the heater to burn out resulting in expensive downtime and partial or total replacement of costly equipment. Operation of such a unit can also give rise to problems. The air-gas ratio must be properly controlled, the temperature generated by the heater depending on the plant throughput. This requires supervision and rather complicated and expensive control equipment. These problems, of course, are present in the split flow and direct oxidation processes as well as in the straight through method.

SUMMARY OF THE INVENTION

We have now developed a unique apparatus suitable for use as a combination reheater, condenser and separator for the recovery of free sulfur from hydrogen sulfide containing gases. This apparatus, in addition to effecting substantial economy in construction and being compact, serves the very important function of reheating gases to a reactor without the disadvantages mentioned above that are characteristic of bypass or inline reheating. This apparatus may be used in either the Claus process or the direct oxidation method discussed above. The apparatus of our invention is designed to take the effluent from a first reactor, cool the gas, separate the free sulfur therefrom in liquid form and return the uncondensed gas to the reheater section where it exchanges heat with the aforesaid effluent and is brought to the desired preheat temperature prior to introduction in the second reactor.

The apparatus of our invention is further illustrated by reference to the accompanying drawings wherein.

Figure 1:
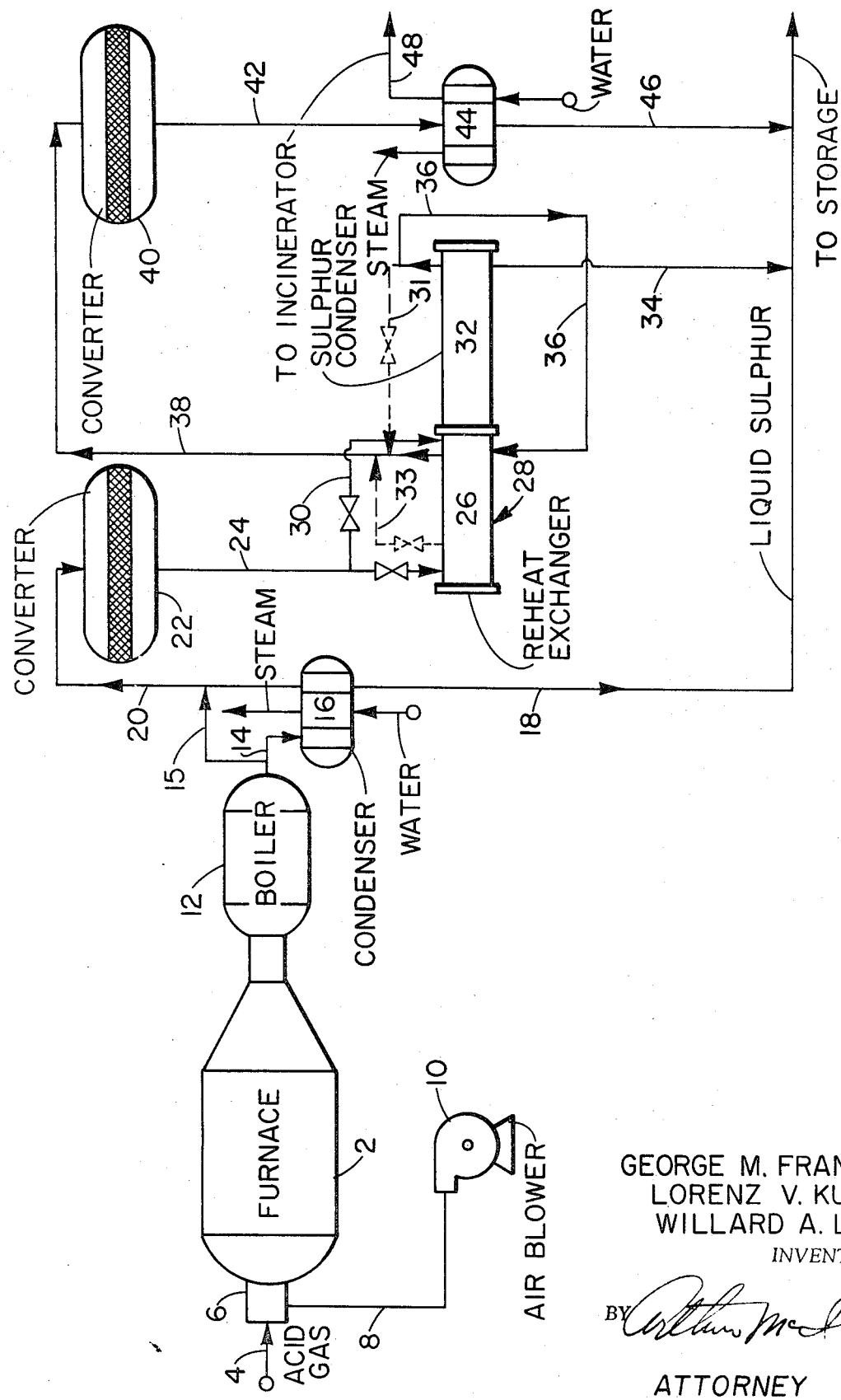
FIG. 1 is a flow diagram of a sulfur recovery plant of a type contemplated herein in which the novel apparatus of our invention is employed between the two reaction vessels or converters.

Referring again to FIG. 1, an acid gas feed such as that taken from a conventional gas sweetening system is introduced into furnace 2 via line 4 and burner 6. Air required for the reaction is added to the furnace through line 8 by means of blower 10. In the furnace, a portion of the hydrogen sulfide is converted to sulfur dioxide at a temperature in the neighborhood of 2500° F. Also, some of the sulfur dioxide thus produced reacts with the hydrogen sulfide to form free sulfur. The quantity of sulfur thus produced oftentimes represents from about 40 to 60% of the total recoverable sulfur. Gases containing hydrogen sulfide, sulfur dioxide and free sulfur are discharged from furnace 2 into boiler 12, cooled to about 1000° to about 1200° F. and conducted therefrom through line 14 to condenser 16 where the sulfur produced in the furnace is converted into a liquid and removed through line 18. A portion of the boiler effluent in line 14 is bypassed around the condenser via line 15 and used as reheat gas for the uncondensed phase taken off from condenser 16 through line 20 at a temperature of about 350° to 375° F. The gas bypassed in line 15 and the effluent in line 20 from condenser 16 are so proportioned as to produce a mixture having a final temperature of about 450° F. The hot gaseous mixture in line 20 is then introduced into catalytic reactor 22 where a substantial portion of the hydrogen sulfide and sulfur dioxide in said mixture is converted to free sulfur and withdrawn from said reactor via line 24 at a temperature of the order of 610° to 625° F. The hot effluent in line 24 is introduced into the reheat exchanger portion 26 of our novel apparatus 28 which is employed as a heat exchanger, condenser and separator. Control of the heat going to exchanger 26 is accomplished by means of bypass line 30. In normal operations approximately 25% of the effluent stream in line 24 is bypassed around heat exchange section 26 and introduced into condensing section 32.

In a typical case effluent in line 24 enters heat exchanger 26 and is withdrawn therefrom at a temperature of about 550° F. after which it enters condensing section 32 where a substantial amount of liquid sulfur forms and is removed therefrom via line 34. The uncondensed portion of the effluent from reactor 22 at a temperature of about 350° to 375° F. through line 36 and reenters the shell side of exchanger 26 where it is heated by indirect heat exchange with hot effluent entering the tube side of the exchanger via line 24. The resulting preheated uncondensed reactor effluent is removed from exchanger 26 by means of line 38 at a temperature of about 425° F. and sent to a second catalytic reactor 40 where further conversion of the unreacted hydrogen sulfide and sulfur dioxide is effected to obtain additional free sulfur. The effluent from this reactor is removed through line 42 at a temperature of about 460° F. and sent to condenser 44 where additional product sulfur is removed in liquid form therefrom by means of line 46 and combined with product sulfur flowing into line 18 from line 34. The uncondensed gases taken off in condenser 44 are removed through line 48 and sent to a suitable incinerator not shown.

Figure 2:
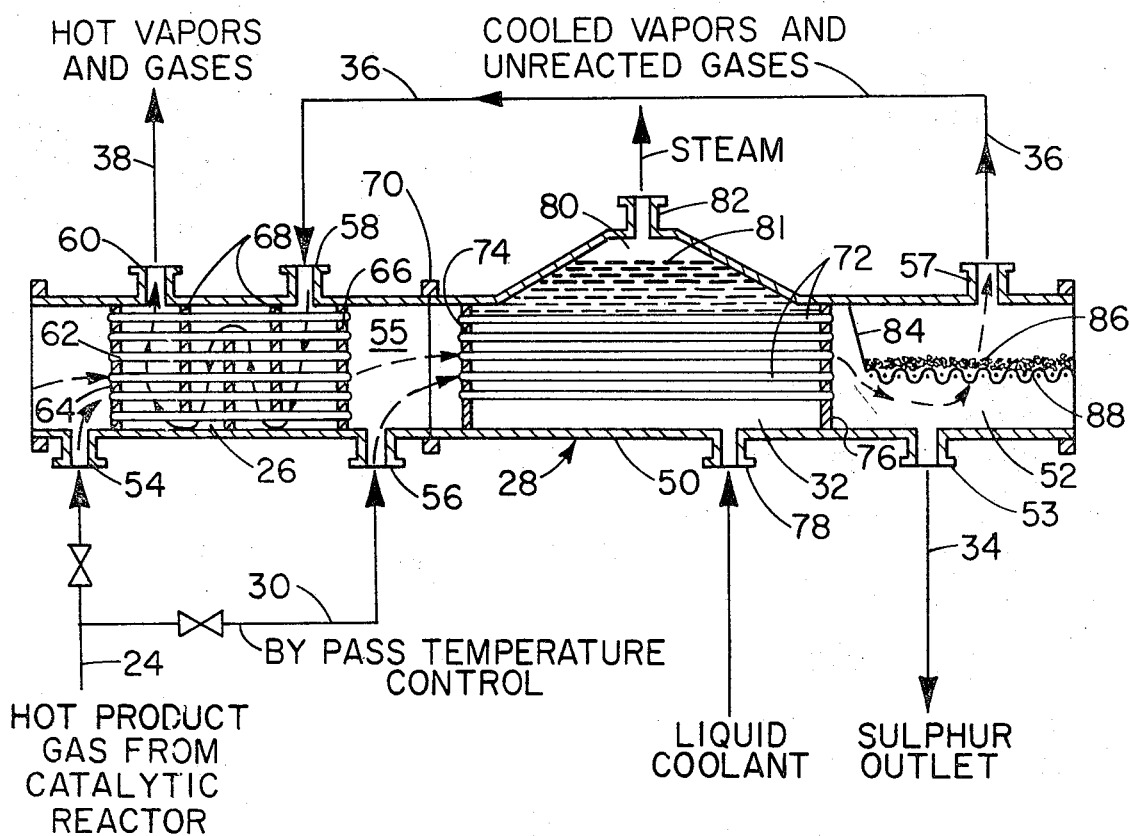
FIG. 2 is a sectional side elevational view of the novel apparatus.

FIG. 2 is a sectional view of the novel reheater and condenser of our invention comprising a generally cylindrical shell 50 containing reheater section 26, condensing section 32 and separation chamber 52. Reheater section 26 is equipped with hot gas inlet nozzles 54 and 56, cooled gas inlet nozzle 58 and nozzle 60 out of which flow the reheated feed gases for the subsequent reactor. Tubes 62 are held in place at opposite ends by means of tube sheets 64 and 66. Baffles 68 are placed in tubes 62 so as to cause incoming gas through nozzle 58 to flow in the path indicated by the dashed line arrows thereby absorbing heat from the hot gases flowing through tubes 62. Reheater section 26 may be attached to condensing section 32 by means of a flange 70.

Condensing section 32 is equipped with a set of cooling tubes 72, the opposite ends of which are held by tube sheets 74 and 76. These tubes are sealed in the tube sheets and open into separator chamber 52 and space 55 between the heat exchange and condensing sections. The tubes are disposed in the bottom two-thirds or three-fourths of the water jacket, the water being maintained in this jacket up to a level 81 with a steam disengaging space 80 above the water level, steam being removed through nozzle 82 at pressures up to about 65 p.s.i.g. At the base of the condensing section is a water inlet nozzle 78. Gases entering condensing section 32 follow the paths indicated by the dashed line arrows. Generally about 25% of the hot gases in line 24 are diverted through valved bypass line 30 and sent directly to condenser 32. A greater or lesser volume of gas may be bypassed in this manner, depending of course on the temperature desired from reheater 26, thus providing apparatus adapted to accommodate a wide range of operating conditions.

Separation chamber 52, having sulfur outlet 53 and gas outlet 57, is equipped with a baffle 84 connected to the demister support 88. Demister 86 may be of any rather finely divided material inert to the gaseous materials contacting it in chamber 52. Generally we prefer to use a stainless steel wool pad for this purpose.

While we generally prefer to employ the apparatus of our invention to operate on reactor effluent gas that is to be sent to a subsequent reactor, it should also be pointed out that such apparatus may be used immediately after the boiler of a conventional Claus plant. In such case a greater percentage of the boiler effluent should bypass the reheater section 26 and flow directly to condensing section 32 as shown in FIG. 2. Only enough hot effluent should be sent through reheater 26 as is required to increase the temperature of the cooled gases in line 36 to a temperature of the order of 450° F. prior to passage from the reheater through line 38 to the first reactor.

Alternative to the scheme shown in FIG. 1 for operation of apparatus 28, we may regulate the temperature of the gas in line 38 by employing the flow of cool gas through reheater 26 as shown by dashed line 31. Thus, after closing valve line 30, generally about 25% of the cool gas in line 36 is diverted through line 31 and sent directly to line 38. A greater or lesser volume of gas may be bypassed in this manner, depending on the temperature desired, as reactor feed, thus providing apparatus adapted to accommodate a wide range of operating conditions. Where the apparatus of our invention operates on the boiler effluent from a conventional Claus plant, a greater percentage of the condenser effluent in line 31 should bypass the reheater section and flow directly to line 38. Only enough cool effluent from separation chamber 52 should be sent to reheater 26, and then through dashed line 33, as is required to increase the temperature of the mixed gases in line 38 to a temperature of the order of 450° F. prior to passage to the first reactor.

One of the advantageous features of the novel apparatus of our invention is that by virtue of this design there is less pressure drop through this portion of the plant than there ordinarily would be with separate reheater, condensing and separation units. As a result the blower requirements for a plant employing our invention are less than those necessary for a conventionally designed plant. Also it should be pointed out that plants using our equipment not only can be operated more cheaply but require a lower investment cost than conventional sulfur recovery units. The magnitude of the savings obtained with a design of this type varies with the size of the plant. Thus, for a 1500 long ton per day plant in which our invention was used, approximately $15,000 was saved in equipment costs, including coalescers, piping, foundations and insulation. These costs represent a savings of $10.00 per long ton of daily capacity in initial investment with a plant of the size just mentioned. In the case of smaller plants, the savings per ton of daily capacity is greater because of higher proportional costs for each ton of capacity.

We claim:

1. In a unitary apparatus for processing free sulfur containing gases the combination comprising an elongated metal vessel having therein in serially spaced and end to end relationship, respectively, a heat exchange section, a condensing section and a separation chamber, said heat exchange and condensing sections being in substantially unrestricted communication with one another and said condensing section and separation chamber likewise being in substantial unrestricted communication with one another.

2. The apparatus of claim 1 wherein inlet means in said heat exchange section opens into the side of said exchanger that is in communication with said condensing section, inlet and outlet means in said exchange section communicating with the other side of said exchange section, and inlet and two outlet means separate from each other in said chamber for removing liquid sulfur and uncondensed gases.

3. The apparatus of claim 2 having an inlet means between said heat exchange and condensing sections.

4. The apparatus of claim 2 wherein said separation chamber is equipped with vapor-liquid disengaging means.

5. The apparatus of claim 2 wherein the condensing section contains a plurality of hollow tubular members held in place in fluid-tight relationship by a tube sheet at each end of said members, said tube sheets extending to the walls of said vessel thereby defining said condensing section and a steam disengaging space in said condensing section.

6. The apparatus of claim 3 wherein a conduit is affixed to the inlet means in the heat exchange section, said conduit having a bypass of variable flow capacity operatively attached to the inlet means between said heat exchange and condensing sections.

7. The apparatus of claim 1 wherein a conduit is affixed to said separation chamber, said conduit having a bypass line of variable capacity, and a conduit adapted to take effluent from said heat exchange section and joining said effluent with the flow from said bypass line.

References Cited

UNITED STATES PATENTS

| | | | |
|---|---|---|---|
| 1,730,892 | 10/1929 | Leslie | 203—87X |
| 2,614,908 | 10/1952 | Railsback | 23—224 |
| 3,057,698 | 10/1962 | Grekel et al. | 23—225X |
| 3,399,970 | 9/1968 | Grekel et al. | 23—225 |
| 3,423,293 | 1/1969 | Holden | 202—172 |

NORMAN YUDKOFF, Primary Examiner

R. T. FOSTER, Assistant Examiner

U.S. Cl. X.R.

23—225; 55—73